(12) United States Patent
Weintraub et al.

(10) Patent No.: US 11,578,558 B2
(45) Date of Patent: Feb. 14, 2023

(54) CHOKE WITH SINGLE CRYSTAL FLOW CONDUITS

(71) Applicant: Proserv Gilmore Valve LLC, Houston, TX (US)

(72) Inventors: Preston Weintraub, Spring, TX (US); Ryan Bludau, Katy, TX (US)

(73) Assignee: Proserv Gilmore Valve LLC, Houston, TX (US)

( * ) Notice: Subject to any disclaimer, the term of this patent is extended or adjusted under 35 U.S.C. 154(b) by 0 days.

(21) Appl. No.: 17/395,019

(22) Filed: Aug. 5, 2021

(65) Prior Publication Data
US 2022/0042394 A1    Feb. 10, 2022

Related U.S. Application Data

(60) Provisional application No. 63/062,147, filed on Aug. 6, 2020.

(51) Int. Cl.
*E21B 34/06* (2006.01)
(52) U.S. Cl.
CPC ..................................... *E21B 34/06* (2013.01)
(58) Field of Classification Search
CPC ......... E21B 34/06; F16K 25/005; F16K 3/316
See application file for complete search history.

(56) References Cited

U.S. PATENT DOCUMENTS

| | | | |
|---|---|---|---|
| 8,490,652 B2* | 7/2013 | Bohaychuk | F16K 3/24 137/625.33 |
| 8,627,893 B2* | 1/2014 | Otto | E21B 34/06 166/373 |
| 10,012,325 B2* | 7/2018 | Bohaychuk | F16K 11/0716 |
| 10,591,076 B2* | 3/2020 | Weintraub | F16K 11/065 |
| 11,041,358 B2* | 6/2021 | Jones | F16K 25/005 |
| 11,054,050 B2* | 7/2021 | Weintraub | F16K 11/0655 |
| 2016/0108699 A1 | 4/2016 | Martino et al. | |
| 2016/0186526 A1 | 6/2016 | Elliott et al. | |
| 2017/0102084 A1 | 4/2017 | Bohaychuk et al. | |
| 2020/0049270 A1 | 2/2020 | Weintraub | |

OTHER PUBLICATIONS

PCT/US2021/044762, International Search Report and Written Opinion dated Oct. 27, 2021, 12 pages.

* cited by examiner

*Primary Examiner* — Aaron L Lembo
(74) *Attorney, Agent, or Firm* — Patterson + Sheridan, LLP (57) ABSTRACT

A choke includes a cage having a plurality of openings extending therethrough, a first fluid port and a second fluid port, the openings in the cage fluidly interposed between the first and second fluid ports, and a selectively positionable blocking member positioned with respect to the openings to selectively overlie all of a portion of the openings, wherein the surface of the opening extending through the cage are a single crystal material. The single crystal material may be provided as an insert, having an opening therethrough, secured in position with respect to the cage.

19 Claims, 7 Drawing Sheets

CHOKE WITH SINGLE CRYSTAL FLOW CONDUITS

CROSS-REFERENCE TO RELATED APPLICATIONS

This application claims benefit of U.S. provisional patent application Ser. No. 63/062,147, filed Aug. 6, 2020, which is herein incorporated by reference.

BACKGROUND

Field

The present invention relates to the field of the control of fluid flow, more particularly the flow of fluids in oil and gas production and control of equipment used in that production, and more particularly still to a choke configured to allow or prohibit flow through one or more flow openings therein, wherein one opening can be fully exposed for flow therethrough while an additional opening is not exposed, partially exposed, or fully exposed for flow therethrough.

Description of the Related Art

Fluid chokes are used to provide a controllably variable opening in a flow line, for example a flow line having a liquid such as a control fluid or a downhole or well-produced fluid such as liquid crude oil or a mixture of crude oil and a gas, such as entrained air for lifting or naturally entrained hydrocarbon gas. For example, when a valve is opened in a flow line where liquid under pressure is present at the inlet thereof, and the fluid pressure on the outlet side thereof is lower, the liquid will flow from the valve inlet to the valve outlet, and simultaneously experience a drop of pressure. If the pressure of the liquid falls below the vapor pressure thereof, vapor bubbles or cavities will appear in the fluid. If an increase in pressure is then experienced by the liquid, the bubbles or cavities of vapor collapse, causing cavitation which can result in erosion of the flow line and control components. Additionally, where the choke is used to control fluid flowrates and pressure drops in an oilfield production environment, the fluid flowing through the choke will contain abrasives, typically sand, well cuttings, and other solids, which when flowing through the choke tend to abrade the surfaces thereof, particularly the entry, exit and inwardly facing surfaces of the smaller diameter openings used as flow passages in the choke, where the available cross sectional area for flow through the choke is changed by selectively changing the number of openings directly exposed to the volume of fluid passing through the choke. This erosion, as well as cavitation, cause the flow characteristic of the fluid flowing through the choke to change over the service life of the choke. Typically, the choke provides optimum performance when new, and the performance deteriorates over time. When a choke is used in a flow line coming from a newly producing well, it will typically encounter substantial particulates in the fluid flow, leading to rapid deterioration on the choke performance.

One method of controlling flow in a fluid circuit where different pressures may be encountered as the fluid flows through various restrictions, valves, and flow conduits is to employ a fluid choke to adjust the flow or pressure drop in the fluid passing therethrough. The choke can be dynamically controlled, wherein the cross sectional area available for fluid flow therethrough may be adjustable, and may also be adjustable based on fluid conditions upstream or downstream of the fluid choke. One methodology used to enable this variable flow area includes providing a choke with a number of flow passages interposed between the choke fluid inlet and the choke fluid outlet, and providing a blocking mechanism to selectively block one or more of the openings to prevent or substantially control fluid flow therethrough. In this construct, the blocking mechanism is spaced from a wall having the opening(s) therein such that full closing of the flow through the choke will not occur, as fluid can leak between the surface of the blocking mechanism and the adjacent wall through which the choke flow passage to be selectively covered is located. Additionally, any individual one of the openings may be partially blocked to limit the flow opening area therethrough. For example, if for example 10 flow passage of equal area are provided between the choke inlet and the choke outlet, zero to one hundred percent of the area of these openings can be covered to allow or substantially restrict fluid flow therethrough. Where a higher pressure is present at the outlet than at the inlet, and one of the ten openings is open to flow therethrough, the flow velocity through the opening will be, in relative terms, high, and the pressure drop will be, in relative terms, high, and the flow rate through the choke is relatively low. The greater the number, area, or number and area of openings available for flow through the choke, the lower, in relative terms, the fluid velocity and the pressure drop, and the higher the total achievable flow rate therethrough for a given fluid pressure immediately upstream of the choke. Typically, the choke is configured to that discrete numbers of openings are partially or fully blocked or open, and it "ratchets" between these preset settings.

One such device is known as a cage and plug choke, wherein a cylindrical cage having openings therethrough is interposed between the upstream or inlet side of the choke and the downstream or outlet side of the choke, and a plug is moveable within the cage to selectively block on or more of these openings. The cage is in the form of an annular walled cylinder, where the openings are spaced along the length or height direction of the annular wall of the cage, and by moving the plug, different ones of the openings are blocked off between the inlet and outlet sides of the fluid choke, and thus one or more of these openings may be partially blocked. By proper spacing and sizing of openings through the annular wall in both the circumferential and longitudinal direction of the wall, a continuous, or nearly continuous, change in total opening area of uncovered openings can be achieved as the plug is moved to cover or uncover additional openings through the cage.

Another fluid choke design used in oil and gas exploration and production is an external sleeve choke. Here, a hat or can shaped solid outer sleeve is movable between a seated sealing position and additional locations spaced from the seat, and the can or hat shaped sleeve surrounds an internal cage. Moving the external sleeve toward or away from the seat exposes the openings extending through the cage, allowing fluid flow therethrough, and the openings are all spaced from the seat, resulting in low flow velocity adjacent to the seat.

One issue encountered in fluid chokes is erosion of the openings forming the variable flow area through the fluid choke. Over time, the fluid passing through the openings will erode the walls of the openings and the facing surface of the plug. When the plug wears, its circumference becomes locally smaller, allowing a greater flow are between the wall of the plug and the facing surface of the cage, leading to a change in the flow characteristic of the choke. Likewise, eroding of the walls of the cage also changes the surface area of the flow area therethrough, leading to changes in fluid flow control using the choke. To address this, carbide, for example, tungsten carbide, has been used to form the portion of the choke having the flow openings, however, this material still erodes over time, particularly where particulates or cavitation is present in the fluid flow. Additionally, where large pressures are present across the openings, local deformation of the cage and plug can result in rubbing therebetween, leading to a change in the energy required to move the plug in the cage, and also causing wear at the rubbing surface. Because fluid chokes in subsea environments are typically operated by fluid pressure in a fluid control circuit, where the fluid pressure is stored or accumulated in accumulators, this friction of rubbing increases the pressure that must be supplied to cause the pug to move in the cage, and may also lead to delays in movement of the plug in the cage, eroding the control capability of the fluid flow and pressure in the flow line, which is enabled by the choke.

Additionally, the erosion of the surfaces of the openings in the cage leads to changes in the valve operation, in particularly the "valve trim" or flow characteristics therethrough in relation to the amount the plug, or the external sleeve, moves versus the resulting changes in pressure drop and fluid flow through the valve. As the surfaces of the opening erode, this results in changes in valve trim as the friction between the fluid and the openings change as the contours of the openings change, and as the openings become enlarged as a result of erosion thereof, the point of initial opening or facing of the opening directly into the flow stream though the choke versus the plug or external sleeve location changes. This results in degraded choke control, and can lead to increased cavitation in the choke, further eroding the choke surfaces and further degrading choke performance.

SUMMARY

A choke includes a cage having a plurality of openings extending therethrough, a first fluid port and a second fluid port, the openings in the cage fluidly interposed between the first and second fluid ports, and a selectively positionable blocking member positioned with respect to the openings to selectively overlie all of a portion of the openings, wherein the surface of the opening extending through the cage are a single crystal material. The single crystal material may be provided as an insert, having an opening therethrough, secured in position with respect to the cage

DETAILED DESCRIPTION

Figure 1:
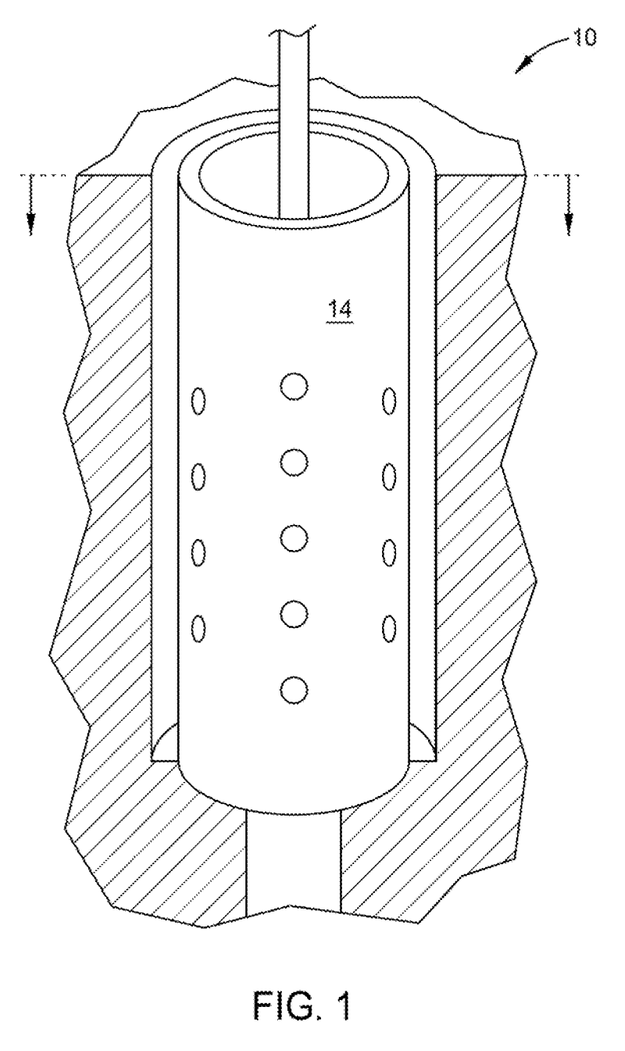
FIG. 1 is an external view of the cage of a choke, for example a plug and cage choke or an external sleeve choke.
Figure 2:
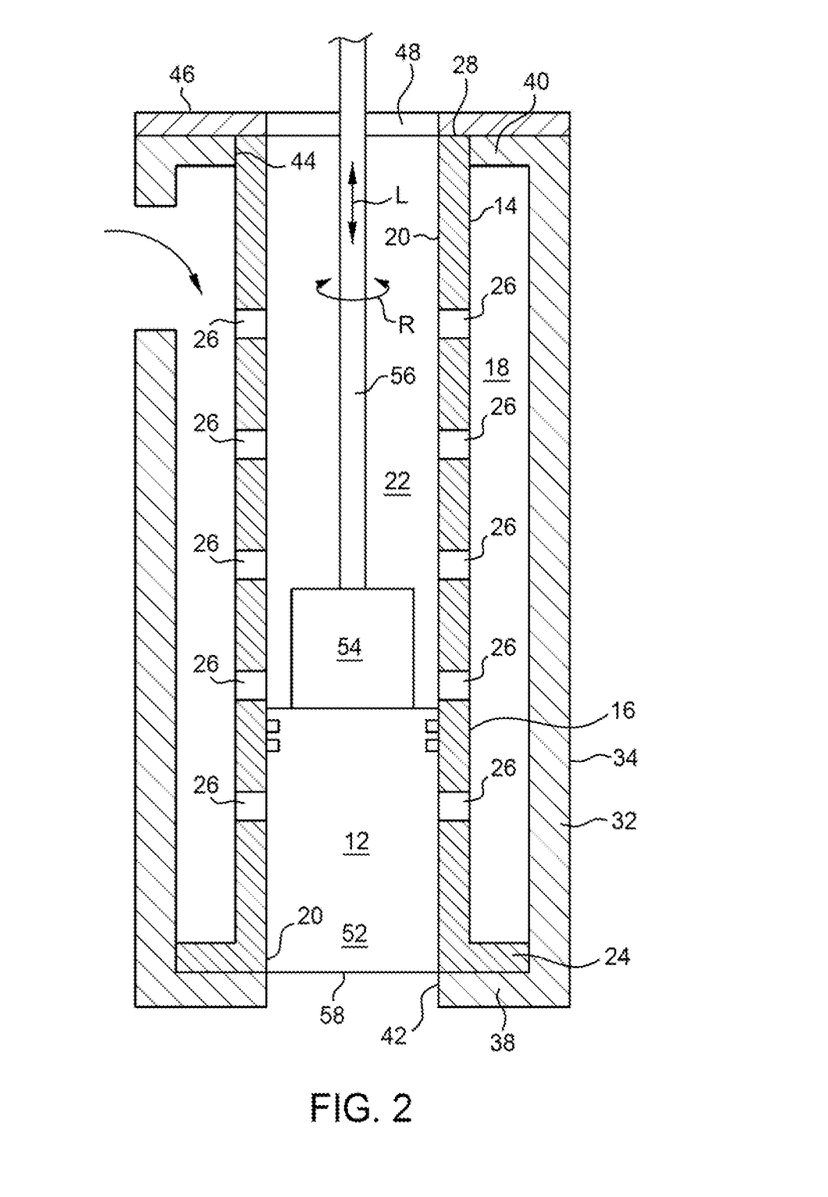
FIG. 2 is a sectional view of a plug and sleeve choke, wherein the plug is located for minimum flow through the choke.

Referring initially to FIGS. 1 and 2, a plug and cage style fluid choke 10 is shown schematically, to demonstrate the operation of the plug 12 in the cage 14. Here, the cage 14 is a right cylindrical tube, having an outer surface 16 facing an inlet manifold 18, an inner surface 20 circumferentially surrounding an inner volume 22 and a plurality of openings 26 each opening through the inner and outer surfaces 16, 20 and enabling fluid communication between a portion of the inner volume 22 and the inlet manifold 50. The cage 14 further includes an outlet end 24 and a second end 28 distal to the outlet end 24.

Choke body 30 includes a circumferential wall 32 having an inner wall 36, an outer wall 34, an outlet end 38 and a second body end 40, distal to the outlet end 38. Outlet end 38 includes a bore 42 extending therethrough in fluid communication with the inner volume 22 of the cage 14, and the second body end 40 includes an opening therethrough into which the second end 28 of the cage 14 is located. Bore 42 may be threaded, or otherwise configured to be attached to an outlet conduit (not shown) extending from the choke 10. A cover plate 46, with a central opening 48 extending therethrough, is located over the second body end 40 and the second end 28 of the cage 14, and is secured to the choke body 30 body such as by fasteners (not shown) extending through openings therein and into threaded apertures in the second body end 40, a clamp, or other mechanism, with appropriate fluid seals (not shown). The cover plate 46 maintains the cage 14 within the interior volume of the choke body 30. The outer surface 16 of the cage 14, the inner surface of the second body end 40, the outer end 24 of the cage 14, and the inner wall 36 of the body together define the boundaries of an inlet manifold 50 which surrounds the cage 14. The inner wall surface 20 of the cage 14 extends as a right circular wall, having the plurality of openings 26 each opening thereinto.

Figure 3:
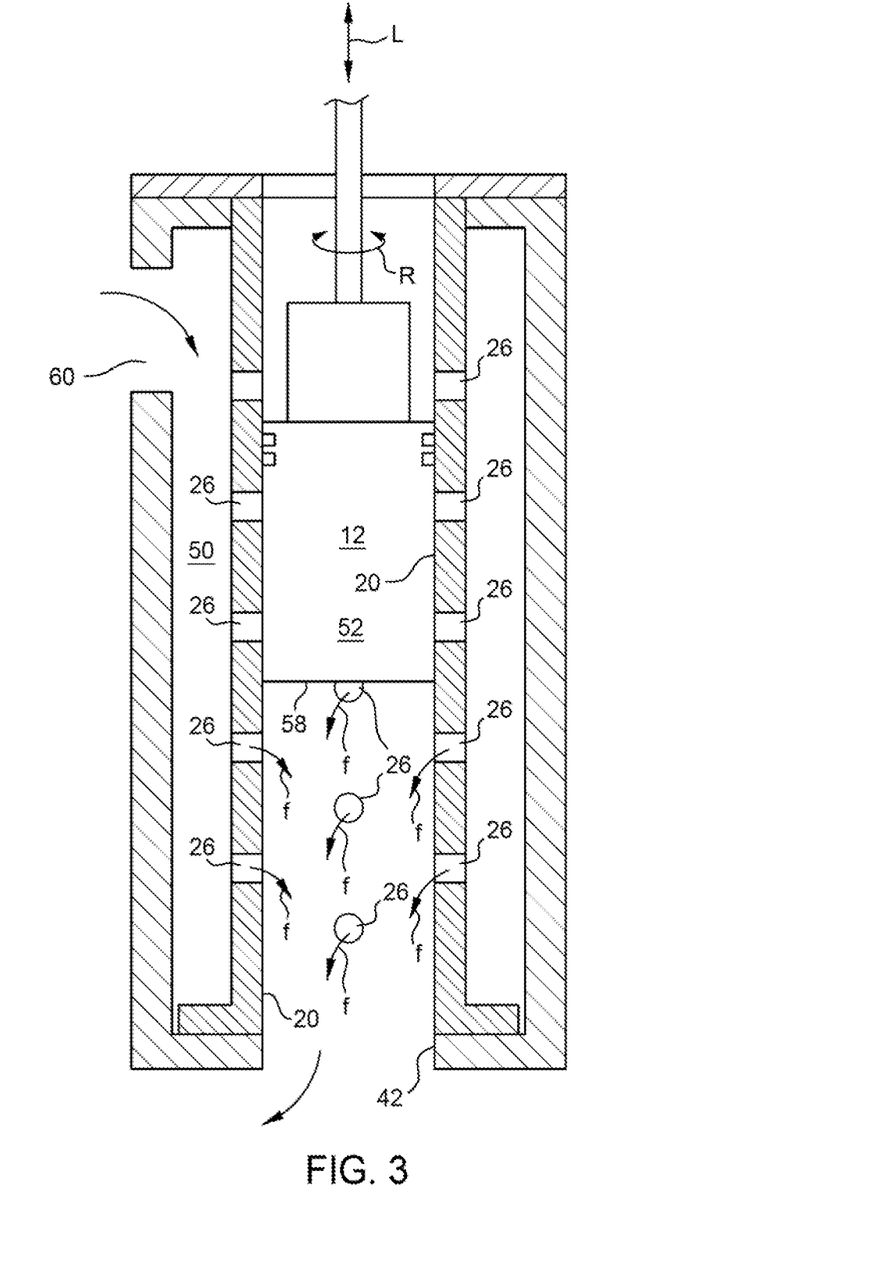
FIG. 3 is a sectional view of the plug and cage choke of FIG. 2, with the plug moved to increase the flow rate therethrough.

The plug 12 includes a right cylindrical plug outer wall 52, such that a radial clearance on the order of 0.005 to 0.0010 inches is present between the outer plug wall 52 and the adjacent inner surface 20 of the cage 14. Plug outer wall 52 is connected to an attachment boss 54, which is in turn connected to an actuation rod 56 which is operably, by a fluid or other operated mechanism to move longitudinally in the directions of arrow L, rotationally in the directions of arrow R, or both the R and L directions. Actuation rod 56 is typically threaded into, at one end thereof, a corresponding threaded opening in the boss 52 (not shown). Movement of the actuation rod 56 in the direction L moves the location of the lower wall 58 of the plug, such that movement of the plug 16 away from outlet end 38 results in openings 26 becoming un blocked as shown in FIG. 3, thereby allowing a greater flow area through the cage 14, and vice versa. As shown in FIG. 3, with the plug 12 pulled away from the bore 42 which serves as the normal fluid outlet of the choke, as a number of the openings 26 are uncovered, fluid can flow from the normal inlet 60, within the manifold to the fully or partially uncovered openings 26, and then as flows therethrough and ultimately exit through bore 42.

Figure 4:
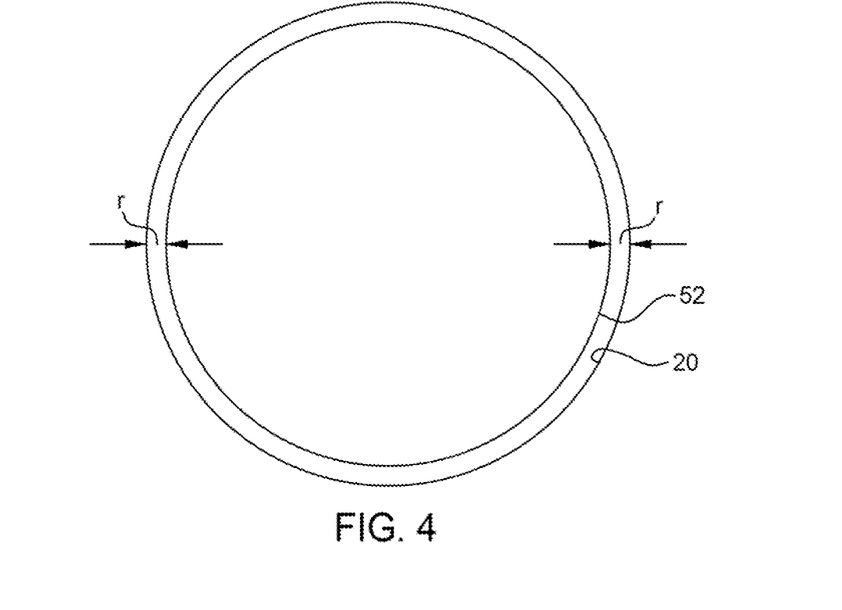
FIGS. 4 and 5 are schematic views of the positioning of the plug in the cage with and without side loading of the plug.
Figure 5:
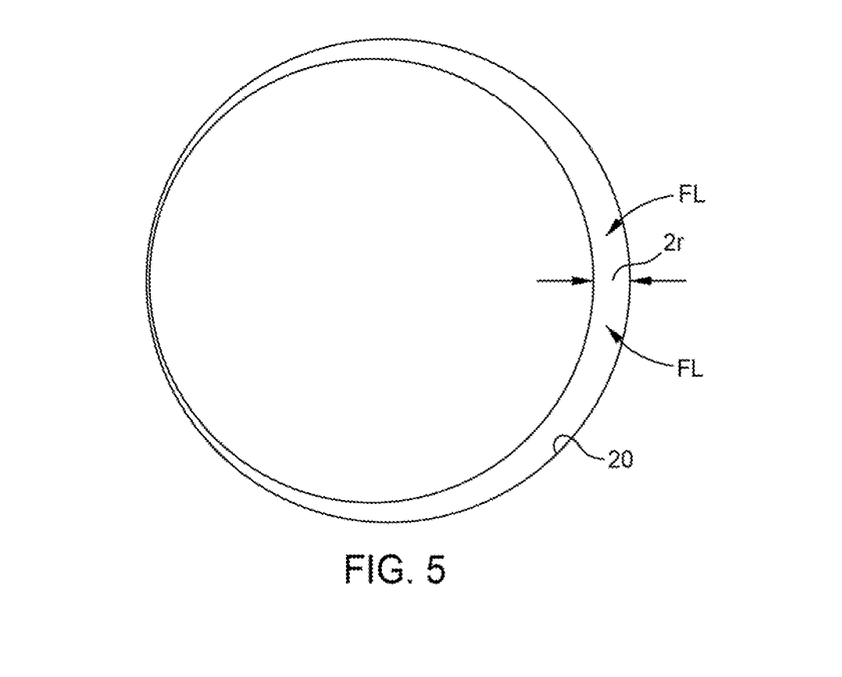

In the embodiment of a choke 10 of FIGS. 1 to 3, at least one of the cage 14 and the plug 12 include a single crystal material, for example a sapphire or ruby material. In FIGS. 1 to 3, the entire cage 14, or the outer plug wall 52 portion of the plug 12, or both comprise the single crystal material. This provides a number of advantages as compared to a carbide surface of each. Firstly, the single crystal material has a greater erosion resistance than carbide, and lower stiction, i.e., attraction of the surfaces in contact with one another is less than that or a carbide to carbide or a carbide to steel contact. As shown in FIG. 4, the nominal radial clearance r when the plug 12 is centered within the cage 14 is r, and if a high fluid load FL is encountered against one side, as opposed to the other, or the plug, the plug outer wall 52 can be loaded against the inner surface 20 of the cage 14 as shown in FIG. 5, such that the maximum clearance between the cage 14 and plug is 2r, and the minimum clearance therebetween is zero. In a carbide to carbide or carbide to steel contact, the stiction, which corresponds to the force needed to move the surfaces with respect to each other at a given load, is significantly larger than a single crystal to steel, or a single crystal to single crystal contacting surface, and thus the operating force needed to move the plug in the direction I is significantly less. Additionally, because of the superior wear characteristics of a single crystal material and lower stiction compared to a carbide or steel material, contact between the plug 12 and cage 14 is not a deleterious to the device as where the plug and cage are one, or both, of steel and carbide. This allows a tighter radial tolerance between the plug 12 and cage 14, i.e., r may be on the order of less than 0.005 inches.

Figure 6:
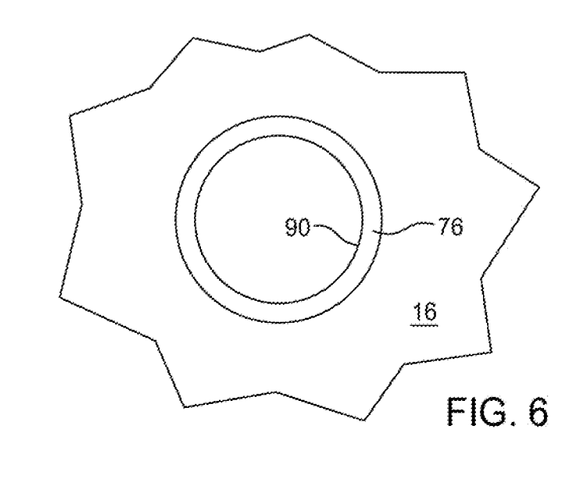
FIGS. 6 and 7 are a plan and sectional view of a flow insert providing the openings of the cage in FIGS. 1 to 3.
Figure 7:
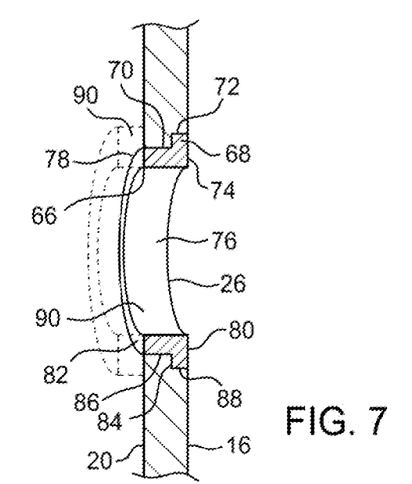

Referring to FIGS. 6 and 7, in another aspect hereof, the cage 14 comprises a base material, for example stainless steel, and the openings 26 are provided through an insert 76 and the insert 76 is brazed into a radially and circumferentially stepped opening 74 in the cage 14. Here, a stepped opening 74 extends from and opens at the inner surface 20 and outer surface of the cage 20, and it includes a circumferential step 68 therein such that the opening includes a minor diameter circumferential wall 66 extending inwardly of the inner surface 20, a major diameter circumferential wall 72 extending inwardly of the cage 14 from the outer surface 16 thereof, and a radially extending annular ledge wall 70 extending between the inner termini of the minor diameter circumferential wall 66 and the major diameter circumferential wall 72. The insert 76 includes a manifold-facing major annular wall 80, a cage inwardly facing minor annular wall 82, and an annular intermediate wall 84, spaced between the manifold-facing major annular wall 80 and the cage inwardly facing minor annular wall 82. An inner annular wall 86 extends between the cage inwardly facing minor annular wall 82 and the annular intermediate wall 84, and an outer annular wall extends between the manifold-facing major annular wall 80 and the annular intermediate wall 84. Here, the insert 76 is a single crystal material such as sapphire or ruby, and it is brazed to the underlying material of the cage 14 in each stepped opening 74. Alternatively, as shown in phantom in FIG. 7, a backing ring 90, likewise composed of the single crystal material, can be located within the cage 14 and brazed to the a cage inwardly facing minor annular wall 82.

Figure 8:
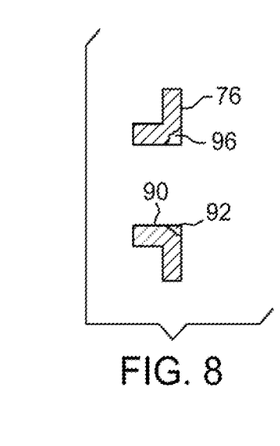
FIGS. 8, 9, 10 and 11 are sectional views illustrating alternate constructs of the insert of FIG. 7
Figure 9:
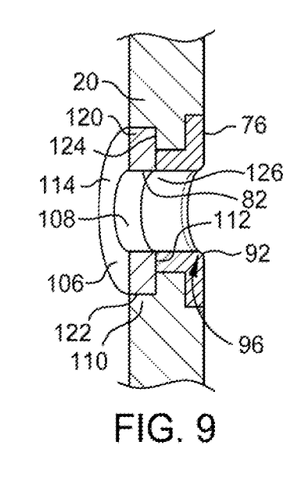
Figure 10:
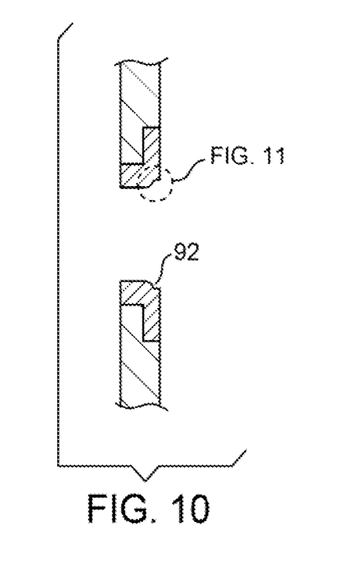
Figure 11:
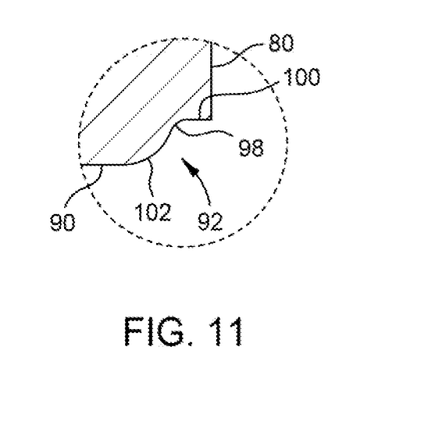

The use of the single crystal inserts 76 allows a flow contour 92 to be maintained at the intersection of the manifold-facing major annular wall 80 and the inner circumferential wall 90 of the insert 76, which allows the choke designer to provide different flow characteristics through the openings 26 in the gage 14, and thus allow a choke user to have a user selectable trim characteristics across portions, or all of, the stroke distance of the plug 12 in the cage 14. In FIG. 9, one such the flow contour is a right angle connection of the manifold-facing major annular wall 80 and the inner circumferential wall 90 of the insert 76. In FIG. 8, the flow contour 92 is provided as an annular quarter rounded inwardly recessed corner at the joinder of the manifold-facing major annular wall 80 and the inner circumferential wall 90 of the insert 76. In FIGS. 10 and 11, the flow contour is provided as a double curved section, with a point of inflection 98 from which a first curved inner wall 100 extends to the major annular wall 80, and a second curved inner wall 102 extends to the from point of inflection 98 to the inner circumferential wall 90 of the insert 76. As the single crystal material provides superior erosion and shock resistance as compared to steel and carbide materials, the flow contour 92 will be maintained for a substantial period of time as compared to a similar contour in a tungsten carbide or steel part under the same flow conditions, allowing the choke designer a flow tuning feature to tune for flow characteristics through the choke 10, without the chipping or erosion of steel or carbide in the presence of severe cavitation or high particulate loads yielding chipped or eroded voids 96 at the flow feature 92. The flow feature 92 may also be provided at the intersection of the inner circumferential wall 90 and the inwardly facing minor diameter wall 82 of the insert 76, or where a backing ring is employed on the inner surface 20 side of the cage to secure the insert 76 thereto and within the opening 26 in the cage 14, on the inner, downstream corner of the insert facing the opening therethrough, or on both the insert 76 and backing ring. Multiple different flow contours are specifically here contemplated, including the right angle and radiused quarter rounds shown, other concave or convex flow contours, as well as compound flow contours having both convex and concave portions extending from a line of inflexion as shown in FIG. 10.

The securement of the insert 76 to extend through the stepped opening 74 in the cage 14 may be accomplished by directly brazing the insert 76 to the underlying material of the cage 14, or, as shown in FIG. 9, by providing the backing ring 106 having an inner annular surface 112 partially resting against the base wall 124 of a ring recess 120 extending inwardly of the inner surface 20 of the cage 14 and partially overlying and facing the base wall 120 of the cage 14, and partially facing the minor annular wall 82 of the insert 76 and brazed to the insert along the inner circumferential parting line 126 therebetween. The insert 76 is no thicker, in the depth direction of the recess 120, than the distance from the inner surface 20 to the base wall 122 of the cage 20. Here, the inner circumferential ring surface 108 has the same diameter or circumference, and same geometric shape in plan view, as the inner circumferential wall 90 of the insert 90, and an outer circumferential ring wall 110 having a diameter greater than the diameter of the stepped opening 74 at the inner surface of the cage 14.

Figure 12:
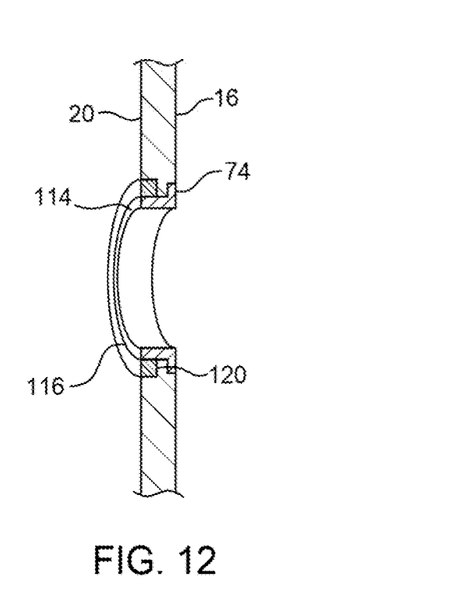
FIG. 12 is a sectional view of an alternative insert construct, wherein the insert extends inwardly of a backing ring and is brazed thereto.

As shown in FIG. 12, the insert 76 can be extended to extend inwardly of the inner circumferential ring surface 108, and the outer surface of the annular intermediate wall 84 extends inwardly of the inner circumference of the backing ring 106 and is there secured to the backing ring 106. For example, the inner circumferential ring surface 108 and the annular intermediate wall 84 may include mating threads, such that the insert, after the annular intermediate wall 84 is inserted through the stepped opening, is threaded into the threads on the inner circumferential ring surface 108. Here, the insert is brazed to a threaded ring, to allow the threading of the insert into the threads on the inner circumferential ring surface 108. Alternatively, no threads may be present, and the insert 76 is brazed to the backing ring along the brazing circumference 118 at the adjoin surfaces of the minor annular wall 82 of the insert 76 and the cage-inwardly facing annular wall 114 of the backing ring 106.

Figure 13:
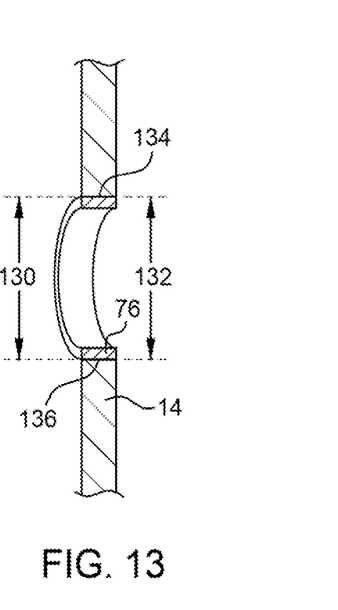
FIG. 13 is a sectional view of an alternative insert construct, wherein the insert is press fit into a cage opening.

As shown in FIG. 13, the insert 76 may also be configured to be press fit into an opening in the cage 14. Here, although the insert 76 may be press fit into the stepped opening 74, here a non-stepped opening 134 extend through the cage 14 from the outer surface 16 to inner surface 20 thereof, and is a bounded by a generally right cylindrical straight sided inner surface 136 of diameter 130. Likewise, here insert 76 of a single crystal material has a generally right cylindrical straight sided outer surface of diameter 132, where outer diameter 132 is several thousandths of an inch, for example 0.005 to 0.015 inches larger in diameter than the inner diameter of the right cylindrical straight sided inner surface 136, in its free state, i.e., before being press fit into the non-stepped opening 134 of the cage 14. Press fitting the insert 76 into an opening in the cage secures the ring in place, and also imposes internal compression in the insert, which increases the erosion resistance of the insert single crystal material by providing a higher impact resistance at the surfaces of the insert 76.

Figure 14:
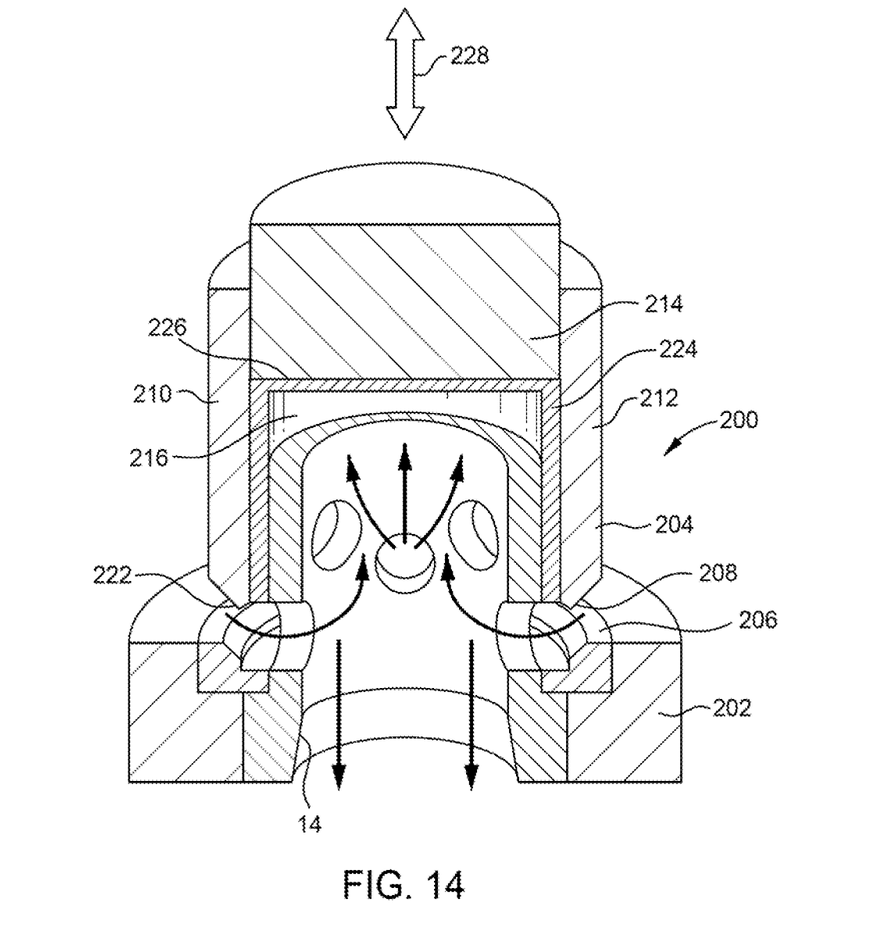
FIG. 14 is a sectional view of an exterior sleeve choke, showing the relationship of the cage and openings to the flow passages in the cage thereof.

Referring to FIG. 14, an alternative construct of the choke, here external sleeve choke 200, is shown. Here, the cage 14, having openings therethrough, extends from a support wall 202 inwardly of an outer sleeve 204. External sleeve 210 is in the shape of a capped sleeve, can or hat, having a cylindrical structural wall 212 extending from a cap 214 and enclosing an inner space 216 into which the cage 14 extends from the support wall 202. A seat 206 is received in a circumferential groove 218 extending around the cage 14 and inwardly of the support wall 202, and the terminal end 222 of the structural wall 212 terminates in a flat annular surface which is moveable with respect to the seat 206, and can be pressed against the seat 206 to seal off fluid flow through the choke. The inner walls of the external sleeve 210 facing the inner space 216 are lined with a circumferential liner 224 and a cap liner 226. The external sleeve 210 is moveable in the direction of arrow 228 to move the terminal end thereof toward and away from the seat 206, and thereby expose one or more of the openings 26 in the cage 14 to direct fluid flow therethrough. As with the cage 14 of FIGS. 2 to 6 hereof, the openings may be provided in a single crystal sleeve providing the structural wall and inner and outer surfaces 16, 20 of the cage 14, or as inserts as shown and described herein with respect to FIGS. 7 to 13.

What is claimed is:

1. A choke having a cage having a plurality of openings extending therethrough, a first fluid port and a second fluid port, the openings in the cage fluidly interposed between the first and second fluid ports, and a selectively positionable blocking member positioned with respect to the openings to selectively overlie all of a portion of the openings,
wherein the surface of at least one of the openings extending through the cage comprises a single crystal material and the entirety of the exposed surface of the opening extending through the cage and which surrounds the at least one opening through the cage is an uncoated surface of a single crystal.

2. The choke of claim 1, wherein the cage consists of a single crystal.

3. The choke of claim 2, wherein the single crystal is sapphire.

4. The choke of claim 1, wherein the single crystal is ruby.

5. A choke having a cage having a plurality of openings extending therethrough, a first fluid port and a second fluid port, the openings in the cage fluidly interposed between the first and second fluid ports, and a selectively positionable blocking member positioned with respect to the openings to selectively overlie all of a portion of the openings, comprising:
an insert interconnected to the cage, the insert comprising at least a portion of the opening through the cage, the insert consisting of a single crystal of a single crystal material.

6. The choke of claim 5, further comprising a backing ring, wherein the insert is connected to the backing ring with a portion of the cage extending therebetween.

7. The choke of claim 6, wherein the insert is connected to the backing ring at a braise therebetween.

8. The choke of claim 6, wherein the insert includes first threads, and the backing ring contains corresponding mating second threads.

9. The choke of claim 5, wherein the cage includes a first opening, and the first opening is slightly smaller than the outer circumference, in the free state, of the insert, and the insert is received in the first opening and is under compressing stress within the first opening.

10. The choke of claim 1, wherein different openings through the cage have different flow profiles.

11. The choke of claim 1, wherein the blocking member is a plug disposed within the cage.

12. The choke of claim 1, wherein the blocking member is a sleeve located externally of the cage.

13. A choke, comprising:
a cage having openings therethrough;
a cap surrounding the cage, the cap including an outer circumferential wall, a cover portion, and an opening, the cage moveable inwardly and outwardly of the cap through the opening;
wherein the surface of at least one of the openings extending through the cage comprises a single crystal material and the entirety of the exposed surface of the opening extending through the cage and which surrounds the at least one opening through the cage is of an uncoated single crystal.

14. The choke of claim 13 further comprising an insert interconnected to the cage, the insert comprising at least a portion of the opening through the cage, the insert configured of a single crystal of a single crystal material.

15. The choke of claim 13, wherein the cage consists of a single crystal material.

16. The choke of claim 6, wherein the backing ring consists of a single crystal.

17. The choke of claim 5, wherein different openings through the cage have different flow profiles.

18. The choke of claim 5, wherein the blocking member is a plug disposed within the cage.

19. The choke of claim 5, wherein the blocking member is a sleeve located externally of the cage.

* * * * *